US010382406B2

(12) United States Patent
Pigin

(10) Patent No.: US 10,382,406 B2
(45) Date of Patent: *Aug. 13, 2019

(54) METHOD AND SYSTEM FOR DIGITAL RIGHTS MANAGEMENT OF DOCUMENTS

(71) Applicant: Encryptics, LLC, Addison, TX (US)

(72) Inventor: Vlad Pigin, Clarkston, WA (US)

(73) Assignee: Encryptics, LLC, Addison, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/946,881

(22) Filed: Apr. 6, 2018

(65) Prior Publication Data

US 2018/0302383 A1    Oct. 18, 2018

Related U.S. Application Data

(63) Continuation of application No. 15/354,629, filed on Nov. 17, 2016, now Pat. No. 9,942,205, which is a continuation of application No. 14/635,262, filed on Mar. 2, 2015, now Pat. No. 9,509,667, which is a continuation of application No. 10/823,042, filed on Apr. 13, 2004, now Pat. No. 9,003,548.

(51) Int. Cl.
| | |
|---|---|
| *H04L 29/06* | (2006.01) |
| *G06F 21/62* | (2013.01) |
| *G06F 21/64* | (2013.01) |
| *H04L 9/08* | (2006.01) |
| *H04L 9/32* | (2006.01) |

(52) U.S. Cl.
CPC ...... *H04L 63/0428* (2013.01); *G06F 21/6209* (2013.01); *G06F 21/64* (2013.01); *H04L 9/083* (2013.01); *H04L 9/3247* (2013.01); *H04L 9/3263* (2013.01); *H04L 63/0823* (2013.01); *H04L 2209/603* (2013.01); *H04L 2209/64* (2013.01); *H04L 2463/101* (2013.01)

(58) Field of Classification Search
CPC ............... H04L 63/0428; H04L 63/0823; H04L 9/083; H04L 9/3263; H04L 2209/603; H04L 2209/64; H04L 2463/101; G06F 21/6209; G06F 21/64
See application file for complete search history.

(56) References Cited

U.S. PATENT DOCUMENTS

| | | | |
|---|---|---|---|
| 4,027,243 A | 5/1977 | Stackhouse et al. |
| 4,393,269 A | 7/1983 | Konheim et al. |
| 4,477,809 A | 10/1984 | Bose |
| 4,484,355 A | 11/1984 | Henke et al. |
| 4,530,051 A | 7/1985 | Johnson et al. |
| 4,545,071 A | 10/1985 | Freeburg |
| 4,707,592 A | 11/1987 | Ware |
| 4,709,136 A | 11/1987 | Watanabe |
| 4,799,156 A | 1/1989 | Shavit et al. |
| 4,947,028 A | 8/1990 | Gorog |
| 4,955,049 A | 9/1990 | Ghisler |
| 5,020,093 A | 5/1991 | Pireh |
| 5,053,606 A | 10/1991 | Kimizu |
| 5,099,420 A | 3/1992 | Barlow et al. |
| 5,220,564 A | 6/1993 | Tuch et al. |
| 5,283,639 A | 2/1994 | Esch et al. |
| 5,412,416 A | 5/1995 | Nemirofsky |
| 5,426,427 A | 6/1995 | Chinnock et al. |
| 5,475,819 A | 12/1995 | Miller et al. |
| 5,483,596 A | 1/1996 | Rosenow et al. |
| 5,577,120 A | 11/1996 | Penzias |
| 5,600,364 A | 2/1997 | Hendricks et al. |
| 5,604,542 A | 2/1997 | Dedrick |
| 5,604,803 A | 2/1997 | Aziz |
| 5,638,513 A | 6/1997 | Ananda |
| 5,655,077 A | 8/1997 | Jones et al. |
| 5,675,507 A | 10/1997 | Bobo, II |
| 5,684,950 A | 11/1997 | Dare et al. |
| 5,689,638 A | 11/1997 | Sadovsky |
| 5,721,780 A | 2/1998 | Ensor et al. |
| 5,802,304 A | 9/1998 | Stone |
| 5,862,339 A | 1/1999 | Bonnaure et al. |
| 5,884,024 A | 3/1999 | Lim et al. |
| 5,889,958 A | 3/1999 | Willens |
| 5,892,900 A | 4/1999 | Ginter et al. |
| 5,896,444 A | 4/1999 | Perlman et al. |
| 5,898,780 A | 4/1999 | Liu et al. |
| 5,898,839 A | 4/1999 | Berteau |
| 5,913,040 A | 6/1999 | Rakavy et al. |
| 5,918,013 A | 6/1999 | Mighdoll et al. |
| 5,935,207 A | 8/1999 | Logue et al. |
| 5,940,074 A | 8/1999 | Britt, Jr. et al. |
| 5,950,010 A | 9/1999 | Hesse et al. |
| 5,974,461 A | 10/1999 | Goldman et al. |
| 5,983,273 A | 11/1999 | White et al. |
| 6,023,585 A | 2/2000 | Perlman et al. |
| 6,023,698 A | 2/2000 | Lavey, Jr. et al. |
| 6,026,079 A | 2/2000 | Perlman |
| 6,061,798 A | 5/2000 | Coley et al. |

(Continued)

FOREIGN PATENT DOCUMENTS

| | | |
|---|---|---|
| EP | 0479660 A2 | 4/1992 |
| EP | 0248403 B1 | 4/1994 |

(Continued)

OTHER PUBLICATIONS

U.S. Appl. No. 15/136,142, Pollet et al.
U.S. Appl. No. 15/136,154, McCarthy et al.
Ford et al, "A Key Distribution Method for Object-Based Protection", ACM, 1994, Retrieved from the Internet on Sep. 10, 2007: <URL: http://delivery.acm.org/10.1145/200000/191225/p193-ford.pdf?key1=191225&key2=0109739811&coll=&dl=acm&CFID=15151515&CFTOKEN=6184618>, pp. 193-197.
Bott et al, "Microsoft Windows Security Inside Out", Microsoft Press, 2003, pp. 351-362.

(Continued)

*Primary Examiner* — Minh Dinh
(74) *Attorney, Agent, or Firm* — Winstead PC

(57) ABSTRACT

An improved method and system for digital rights management is described.

20 Claims, 9 Drawing Sheets

(56) References Cited

U.S. PATENT DOCUMENTS

| | | | |
|---|---|---|---|
| 6,070,192 A | 5/2000 | Holt et al. |
| 6,073,168 A | 6/2000 | Mighdoll et al. |
| 6,128,663 A | 10/2000 | Thomas |
| 6,134,590 A | 10/2000 | Perlman |
| 6,138,119 A | 10/2000 | Hall et al. |
| 6,141,694 A | 10/2000 | Gardner |
| 6,178,505 B1 | 1/2001 | Schneider et al. |
| 6,185,685 B1 | 2/2001 | Morgan et al. |
| 6,289,450 B1 | 9/2001 | Pensak et al. |
| 6,311,197 B2 | 10/2001 | Mighdoll et al. |
| 6,571,290 B2 | 5/2003 | Selgas et al. |
| 6,721,784 B1 | 4/2004 | Leonard et al. |
| 6,824,051 B2 | 11/2004 | Reddy et al. |
| 6,990,684 B2 | 1/2006 | Futamura et al. |
| 7,143,296 B2 | 11/2006 | Hirata |
| 7,149,893 B1 | 12/2006 | Leonard et al. |
| 7,290,285 B2 | 10/2007 | McCurdy et al. |
| 7,310,821 B2 | 12/2007 | Lee et al. |
| 7,353,385 B2 | 4/2008 | Nakano et al. |
| 7,398,556 B2 | 7/2008 | Erickson |
| 7,406,596 B2 | 7/2008 | Tararukhina et al. |
| 7,418,737 B2 | 8/2008 | Grupe |
| 7,472,280 B2 | 12/2008 | Giobbi |
| 7,590,861 B2 | 9/2009 | Abdallah et al. |
| 7,870,198 B2 | 1/2011 | Graham et al. |
| 8,205,078 B2 | 6/2012 | Bhogal et al. |
| 8,239,682 B2 | 8/2012 | Meehan et al. |
| 8,290,160 B1 | 10/2012 | Steeger |
| 8,474,058 B2 | 6/2013 | Benson et al. |
| 8,677,126 B2 | 3/2014 | Meehan et al. |
| 8,838,704 B2 | 9/2014 | Naylor et al. |
| 9,003,548 B2 | 4/2015 | Pigin |
| 9,094,215 B2 | 7/2015 | Meehan et al. |
| 9,942,205 B2 | 4/2018 | Pigin |
| 2001/0029581 A1 | 10/2001 | Knauft |
| 2002/0010679 A1 | 1/2002 | Felsher |
| 2002/0027992 A1 | 3/2002 | Matsuyama et al. |
| 2002/0048369 A1 | 4/2002 | Ginter et al. |
| 2002/0082997 A1 | 6/2002 | Kobata et al. |
| 2002/0091928 A1 | 7/2002 | Bouchard et al. |
| 2002/0099941 A1 | 7/2002 | Tanimoto |
| 2002/0129275 A1 | 9/2002 | Decuir |
| 2003/0037237 A1 | 2/2003 | Abgrall et al. |
| 2003/0044012 A1 | 3/2003 | Eden |
| 2003/0191946 A1 | 10/2003 | Auer et al. |
| 2004/0003139 A1 | 1/2004 | Cottrille et al. |
| 2004/0003269 A1 | 1/2004 | Waxman et al. |
| 2004/0022390 A1 | 2/2004 | McDonald et al. |
| 2004/0148356 A1 | 7/2004 | Bishop et al. |
| 2005/0060537 A1 | 3/2005 | Stamos et al. |
| 2005/0120212 A1 | 6/2005 | Kanungo et al. |
| 2005/0177873 A1 | 8/2005 | Wu et al. |
| 2005/0229258 A1 | 10/2005 | Pigin |
| 2006/0085850 A1 | 4/2006 | Mayfield et al. |
| 2007/0033397 A1 | 2/2007 | Phillips, II et al. |
| 2007/0050696 A1 | 3/2007 | Piersol et al. |
| 2007/0067618 A1 | 3/2007 | Sandhu et al. |
| 2007/0258585 A1 | 11/2007 | Sandhu et al. |
| 2007/0258594 A1 | 11/2007 | Sandhu et al. |
| 2008/0294895 A1 | 11/2008 | Bodner et al. |
| 2009/0154703 A1 | 6/2009 | Price et al. |
| 2011/0082798 A1 | 4/2011 | Michaud et al. |
| 2013/0073854 A1 | 3/2013 | Patti et al. |
| 2013/0326220 A1 | 12/2013 | Connelly et al. |
| 2015/0244688 A1 | 8/2015 | Pigin |
| 2016/0028700 A1 | 1/2016 | Meehan et al. |

FOREIGN PATENT DOCUMENTS

| | | |
|---|---|---|
| EP | 0590861 A2 | 4/1994 |
| EP | 0421808 B1 | 12/1994 |
| EP | 0479660 B1 | 10/1996 |
| EP | 0745924 A2 | 12/1996 |
| EP | 0384339 B1 | 4/1997 |
| EP | 0501697 B1 | 4/1999 |
| EP | 0506637 B1 | 8/2001 |
| EP | 0650307 B1 | 3/2004 |
| EP | 0814589 B1 | 8/2004 |
| GB | 2190820 | 11/1987 |
| GB | 2289598 | 11/1995 |
| WO | WO-8603926 A1 | 7/1986 |
| WO | WO-9317529 A1 | 9/1993 |
| WO | WO-96/00485 A2 | 1/1996 |
| WO | WO-9707656 A2 | 3/1997 |
| WO | WO-9709682 A1 | 3/1997 |
| WO | WO-01097480 A2 | 12/2001 |

OTHER PUBLICATIONS

Microsoft Computer Dictionary, Microsoft Press, 5th Edition, 2002, p. 171.

Schneider, F.B., "Trust in Cyberspace", Dec. 1998 (Dec. 1998) ISBN-10:0-309-06558-5; ISBN-13: 978-0-309-06558-0 [retrieved on Jun. 6, 2007]. Retrieved from the internet, URL:http://www.aci/netkalliste/tic.htm.>, pp. 1-249.

"Authentica Unveils Saferoute for Secure Messaging", Press Release, Dec. 2002, Retrieved from the Internet on Sep. 10, 2007:<URL:http://www.authentica.com/news/pr2002/12-16-2002-saferoute.aspx>, 2 pages.

Thomas, Shane; "International Search Report" prepared from PCT/US16/28834, dated Aug. 30, 2016, 3 pages.

Passports Request

Your name: User 1

Your e-mail address: User1@user.com

Request text:                                    Use Default Request Text

User 1 is requesting to securely communicate with you.
Please download your FREE Essential Security Reader now to communicate securely.
To learn more on personal communications and data security please follow the link to
http://www.essentialsecurity.com It's that easy!

☑ Attach your own passport

| Mark All | Unmark All |          | Add Recipient | Remove Recipients |

| Name | Address |
|------|---------|
| ☐ Steve | steve@steve.com |
| ☐ Mary | mary@mary.com |
| ☐ | |
| ☐ | |
| ☐ | |
| ☐ | |
| ☐ | |

Send    Cancel

FIGURE 7

METHOD AND SYSTEM FOR DIGITAL RIGHTS MANAGEMENT OF DOCUMENTS

BACKGROUND OF THE INVENTION

The present invention relates generally to securing documents and, more particularly, to a method and system for document rights management, file encryption, Digital signing of email/Documents and secure deletion of documents Currently, a number of software-only, hardware-only and software-hardware combination security related products are on the market. They are meant to protect data in electronic documents from unauthorized modification, and to prevent data theft during document transmission over electronic channels. All these tools protect data from outsiders who try to gain unauthorized access to sensitive data, and not from companies' employees. In the meantime, there is a need to prevent both intentional and accidental data leaks from employees' desktops. The most important question is how to protect data from exploitation by authorized users. Protection from intentional and accidental data leaks means most for companies, where such information is of great value, and its leakage can lead to financial losses, as well as credibility losses.

Therefore, what is needed is a system and method that provides secure and efficient document rights management.

SUMMARY OF THE INVENTION

The present disclosure provides a system and method that provides secure and efficient document rights management.

Therefore, in accordance with the previous summary, objects, features and advantages of the present disclosure will become apparent to one skilled in the art from the subsequent description and the appended claims taken in conjunction with the accompanying drawings

BRIEF DESCRIPTION OF THE DRAWINGS

The present disclosure can be described by the embodiments given below. It is understood, however, that the embodiments below are not necessarily limitations to the present disclosure, but are used to describe a typical implementation of the invention.

FIG. 7 is an example screenshot of a Passport Request;

DETAILED DESCRIPTION OF THE PREFERRED EMBODIMENTS

Figure 1:
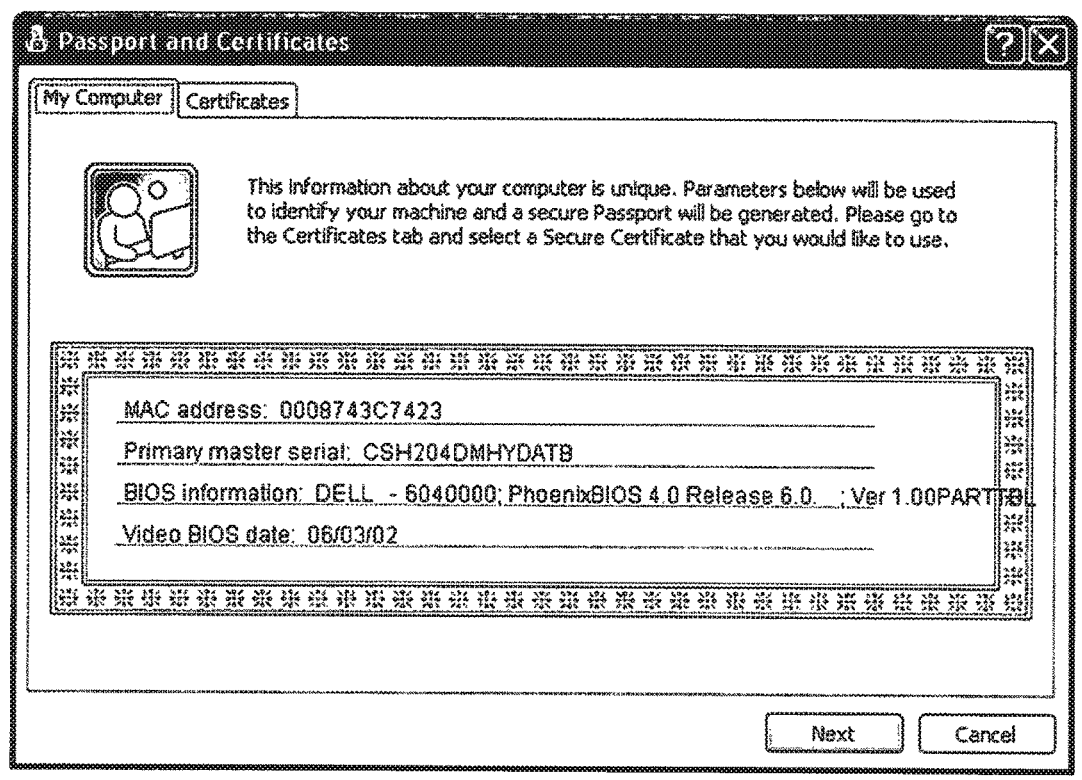
FIG. 1 is an example passport generated screenshot.

The present disclosure can be described by the embodiments given below. It is understood, however, that the embodiments below are not necessarily limitations to the present disclosure, but are used to describe a typical implementation of the invention.

Definitions, Acronyms, and Abbreviations

Author is a person who creates, modifies, and distributes a document, and is responsible for defining usage rights for each of the document's recipients.

Recipient is a person who makes use of the information given in the document created by Author, to the extent limited by the rights set by Author.

CA—Certification Authority.
COTS—Commercial off the Shelf.
RUP—Rational Unified Process.
DOD—Department of Defense.
DRM—Digital Rights Management.
IIS—Internet Information Services.
DLL—Dynamic-Link Library.

The invention allows for secure communication and documents exchange between single users and personnel of small companies with undeveloped documents workflow. There are two types of users described in the preferred embodiment—Document Authors and Document Recipients.

Author has the following use cases:

Request certificate from CA (implemented via standard windows functions);
Register certificate on local machine (implemented via standard Windows functions);
Create document (implemented via standard office software: Microsoft Office, Adobe Acrobat, Microsoft Outlook, Outlook Express, etc);
Generate Passport
Import Recipient's passport;
Encrypt data
Digitally sign data
Set digital rights to data
Safely delete data Recipient has the following use cases:

Generate Recipient's passport;
Request certificate from CA (implemented via standard Windows functions);
Register certificate on local machine (Implemented via standard Windows functions);
View and work with the document;
Decrypt data
Verify digital signature Upon request users may be supplied with a library (Module) to digitally sign web forms, and to verify digitally signed web forms. Shipping will be presumably done in two distinct versions, the server and the workstation client.

The users of both the Essential Security Suite Product and the Essential Security Reader will have the ability to Contact Essential Security Software to revoke their Digital Certificate.

Users can Revoke their Certificate if:

a) Certificate expires
b) Certificate is tampered with
c) User wishes to change certificate The system provides for secure document exchange between single users. A feature that makes the system stand out when compared to competing COTS software is digital rights management. The freedom of Recipient's actions with a protected document may be limited in any way the Author wants. Furthermore, an additional layer of document protection from unauthorized distribution (e.g. by copying, taking a print screen, printing, or email forwarding) is included in the system. This additional layer binds a document to the Recipient's computer via a passport making it impossible to view or copy information on any other media or computer. (See FIG. 1).

A graphic representation of the protected document is sent to the recipient, instead of the documents proper. This approach is used if the recipient does not have rights to edit the document, or copy any of its contents into the clipboard. The system uses an image viewing software (Essential Security Reader) (See FIG. 8) that prevents unauthorized copying, printing and distribution of the document. Graphic representations are created by emulating printing procedures to output bitmaps into files. A very unique feature of Essential Security Reader is the ability to assign digital rights to any document format that can be printed out of Internet Explorer.

There are at least two versions of the software: a commercial version, used by the Author; and a limited version called Essential Security Reader, used by the Recipient.

The Essential Security Suite includes the following functionality:

Selecting documents created by any standard means;
Creating email messages in MS Outlook, Outlook Express, Office 97/2000XP/2003/Adobe Acrobat; with the use of the MSN to Outlook Connector, user can utilize the plug-in available from ESS within MS Outlook. This allows MSN email users to send encrypted and digitally signed email and documents using their MSN or Hotmail email account.
Creating document Recipients lists;
Restricting the Recipient's document usage rights (full rights, forwarding rights, printing rights, viewing rights, screen capture rights (PrintScreen), the possibility to access document for a limited amount of time—when the specified period expires, the document will be automatically and safely purged);
Automated (invisible to Author) conversion of the document into its graphic representation, provided the document was assigned any set of rights but full rights;
Signing any file via Explorer shell right-click menu;
Encrypting any file or folder via Explorer shell right-click menu;
Encrypting and setting digital rights to documents without closing respective office applications;
Encrypting documents with a "document's recipient passport" without closing respective office applications;
Encrypting and assigning user rights to document created using Open Office and Star Office on a Microsoft OS platform. Ex. Windows 2000 and Windows XP w/sp1
Signing email messages without closing MS Outlook;
Encrypting email messages with a "document's recipient passport" without closing Outlook;
Forwarding document with digital rights to a different Recipient; and
Guaranteed data purging according to DOD standards. DoD 5220.22-M The Essential Security Reader will have the following functionality:

Generating a "document's recipient passport";
Verifying document's integrity and signature on its opening;
Decrypting document on its opening;
Decrypting any file or folder via Explorer shell right-click menu;
Verifying any file's or folder's integrity and signature via Explorer shell right-click menu;
Verifying email messages' integrity and signatures without closing Outlook;
Decrypting email messages without closing Outlook;
Monitoring of the user's actions in accordance with set restrictions;
Viewing the graphical representation of a document; and
Guaranteed data purging according to DOD standards, DoD 5220.22-M.

System Requirements for Running Essential Security Suite

The minimum system requirements for running Essential Security Suite:

Processor: 133 MHz or faster Pentium-compatible processor.
Memory: 128 MB of RAM (256 MB or more recommended).
Hard Disk: 32 MB hard disk space.
OS: Windows 2000 with Service Pack 3 or later, Windows XP (Service Pack 1 recommended).
However, the system can also support Windows NT 4.0 with service pack 6 installed. In addition, the system supports Internet Explorer 5.2 or later versions, installed on client workstations.
Essential Security Suite will run on a minimal system configuration, but it is highly recommended to have at least a 1 GHz processor and 256 MB of RAM, otherwise high performance is not guaranteed.

Encryption Standards

The algorithm used for document encryption is RC4—a symmetric encryption stream algorithm included in the MS Windows CyryptoAPI The Encryption length is −88 bit.
The RSA cryptosystem is part of many standards. ISO 9796 describes RSA as a compatible cryptographic algorithm complying with ITU-T X.509 security standards.
The default crypto provider is Microsoft Cryptographic Service Provider.
The user will have the ability to select a crypto provider type themselves. The only requirement is compliance of the provider user to PRO_RSA_FULL specifications.
When receiving a digital certificate from Essential Security Software the user will be able to choose from 512, 1024, or 2048 bit key size.

Document Selection

Any standard document may be selected from the main window of the commercial version of the software by a plug-in to the parent application, or by an Explorer plug-in for already created documents.

To initiate the document selection function from the main window or from the plug-in to the parent application, the user selects the File→Open menu.

To initiate the function from Explorer (as a plug-in), the user selects a file or a folder, and then selects Restrict Rights from the right-click context menu.

In either case, the user is presented with the Document Recipients window upon function initiation.

Create Document Recipients List

This function is initiated after the Document Recipients window becomes active. This function displays two lists: locally registered certificates—names of their owners constitute the list of potential document recipients; and selected document recipients. When a recipient is selected from the first list, he/she is then added to the list of actual recipients and removed from the potential recipients list.

In addition, a «Delete» mode for removing recipients from the list is included in the system. The mode is activated by clicking the «Delete» or by choosing «Delete» from the drop-down menu if the user selected the recipient's entry in the list and right-clicked it.

The user can also select groups of recipients in the conventional way, by holding Control and clicking on user names. Selected entries are highlighted by a different color.

For every chosen recipient or chosen group, limitations can be set for allowed document actions. This mode is called by selecting Restrict Document on the menu or by choosing Restrict Document from username right-click context menu. However, the system does not query for recipient rights to files that are not documents or can not be presented as an image corresponding to the document's printable image (AVI, MP3, etc.). Files that are not documents or can not be presented as an image can be encrypted and signed with full rights assigned. The selecting of other use rights is disabled.

Set Document Usage Rights

This function begins by activating the Usage Rights window. The user may choose from the following options: (See FIG. 5)

- all rights;
- allow forwarding rights;
- Enable printing rights;
- Enable screen capture rights (PrintScreen);
- Right to work with the document beginning from and up to a set date.
- Restricting access before certain date/hour/minute;
- Shred document after certain date/hour/minute;
- Check date and time using local or internet time server.
- Wipe the original document The Recipient by default has viewing rights, as those are the minimal privileges.

The rights are to split in two alternative groups: one for full rights; and a second for a subset of full rights. An example of the window is illustrated in FIG. 1.

After defining the rights of the recipients, they are grouped in two lists: a list of recipients with Full Rights; and a list of recipients with Forwarding rights, Printing rights, Print Screen rights, and/or Date Restrictions. For Full Rights, additional processing is not performed before encryption. For the other rights, a graphic image to indicate the system is processing is displayed.

When the recipient opens the encrypted and signed email or document the certificate is displayed verifying the signature. (See FIG. 13) After closing this certificate another certificate displays to the recipient what rights are enabled for this email or document. (See FIG. 14)

For e-mail letters created in MS Outlook or MS Outlook Express, recipient rights do not have to be defined. If rights are not defined, then all recipients are considered to have full rights and the letter is not encrypted. In this embodiment, attachments to e-mail letters in Outlook are not modified, unless the user directs otherwise. If the user wants to restrict rights on the attachment, the user must first process it as a usual restricted file and then attach to the e-mail letter.

For an e-mail with restricted rights, the letter body is extracted and placed unto a text file named EMailBody.txt; a standard phrase «The letter body has been encrypted and placed in the attached file EMailBody.txt» is then inserted. Processing of the EMailBody.txt file is the same as for the other restricted files.

Automated Document-to-Image Conversion

This function includes creating a page-by-page BMP image of the document corresponding to the printed output image of the document from the parent program (i.e the program with which the document was initially created). The conversion is similar to printing the document to a BMP file or a printer, and displays the progress. In this embodiment, this function is called only when a selected file has a parent program installed.

If the document does not contain the printer's page properties, defaults are used. However, an option is the have the user specify those as well (page size, margin width, portrait/landscape, etc).

Default page properties are: Letter sized paper; top, bottom and left margins are 1 inch wide, right margin is 0.5 inch wide; color settings black and white; and resolution of 300 DPI.

The user can specify at least the following values: Page size; Document color (black-and-white, grayscale, full color); and Resolution in DPI.

When BMP images are being generated, a progress bar along with default page properties are shown.

Digitally Sign and Encrypt a File or Folder

Signing and encrypting is initiated by the user and can be executed by the following document access options:

- from the main window of the commercial version (Crypto Manager) (See FIG. 9), by clicking Sign and Encrypt;
- as a plug-in for the program used for creating the document, by selecting Options→Sign and Encrypt from the menu; and
- a plug-In for Explorer, for previously created documents by right-clicking the selected file and choosing Sign and Encrypt from the context menu. (See FIG. 10)

After the user initiates the sign and encrypt function, a window is displayed containing a list of registered certificates of the document's author. The user can select the necessary certificate for signing the document or cancel the operation. Signing is performed by calling corresponding MS Windows Crypto API functions. A Progress Bar is displayed as the encryption proceeds.

For graphical images of documents every page is signed separately. The system also provides different options for the user to customize the encryption techniques and keys. Encrypted document bodies are placed in a crypto container. Folders that are encrypted and signed are first zipped, then encrypted and signed in the usual way.

Furthermore, every recipient has a symmetric session key used for encrypting the document body and the set of the given user's rights. This information is encrypted using the given recipient's public key. The information is then encrypted again using a unique symmetric key formed from the computer's passport. The data stream received after the second encryption is then placed into a crypto container. The crypto container is then ready for delivery by any means.

Generate the Document Recipient's Passport

This function is activated as a stand-alone application or as a plug-in for Explorer. When the function is called, the software gathers at least the following information about the user's computer: BIOS version number; Video card BIOS creation date; and Primary HDD serial number. (See FIG. 1)

The gathered data is combined into a data flow that is signed by the recipient's digital signature; then the recipient's certificate is added to them to form the final entity that is called Document Recipient's Passport, and saved as a binary file. (See FIG. 2)

The system also allows the Recipient to possess several certificates issued by different certification authorities, by displaying the list of personal certificates and allowing the user to choose the appropriate one. The passport is then passed to the document's author for later use. The user will be given the option to designate a default certificate.

Decrypt Document on Open, Verify Digital Signature and Document Integrity

Depending on the file type and its method of processing, this function can be activated in the following ways:
- from the UI of the free viewer, by selecting Decrypt File (Folder) from the menu;
- as a plug-in for MS Office, by selecting Decrypt from the menu or by clicking the Decrypt button;
- as a plug-in for Explorer, by selecting a file and choosing Decrypt File (Folder) from the right-click context menu; or
- as a Plug-In for MS Outlook, by selecting Decrypt E-mail from the menu, the user will decrypt the message body and it will be restored in its original form; by selecting the attached file and clicking the Decrypt Attachment button, the user will initiate the decryption and open the chosen attached file.

The decryption process is the reverse of the creation of a forwarding-ready crypto container. The decryption begins by forming the recipient computer's passport from the following information: BIOS version number; Video card BIOS creation date; and Primary HDD serial number.

From the passport, a symmetric key is built and an attempt to decrypt one of the sets attached to the document is carried out (every set contains the encrypted symmetric session key used for encrypting the document body and the given user's set of rights.)

If the processing fails to yield a decrypted set of a symmetric session key and recipient rights, the message «The document may not be decrypted on this computer» is displayed, after which the program terminates.

If the processing produces a decrypted set of a symmetric session key and recipient rights, this data is then placed in a closed area of the Decrypt class and may not be copied to external media under any circumstances.

The system then starts to verify the document author's signature and document integrity. The integrity of the page and its digital signature is then verified using the decrypted session key the first page of the document (or the entire document, if the rights did not include creating graphical images) and, by using the Crypto API.

If the signature does not pass the verification, the «File is signed by unknown person» message is displayed.

If hashing indicated file integrity violation, the «File corrupted in transfer» message is displayed.

If signature verification or hashing terminates with an error message, further processing of the file is stopped. However, if signature verification or hashing is successful, the «Verification successful» message and the information on the person who signed the document is displayed.

Figure 13:
FIG. 13 is an example of a certificate.

An example of a window displaying the certificate data of the signing person is illustrated in (See FIG. 13).

Further actions of the recipient are limited by the function Restrict recipient's actions in accordance with defined rights as defined below.

Restrict Recipient's Actions in Accordance with Defined Rights

This function is called automatically after normal termination of decrypting the symmetric session key used for encrypting the document body and the set of the given user's rights. Depending on the user rights he/she is allowed to either save the document on an external media (HDD, CD, etc. . . . ), or open it for viewing and printing.

The «full rights» option enables the user to save the document to external media by automatically decrypting the file. If the document is an encrypted folder, it is decrypted and then unzipped to a path specified by the user. Normally decrypted files are also saved to a path specified by the user.

At this point, the system allows the user to call up the necessary program for editing, copying, printing any number of copies, or listening to and viewing the decrypted document.

Document's Graphical Representation Viewing Rights

The options of Forwarding rights, Printing rights, Print Screen rights, Limit document usage dates are controlled by the function Document graphical representation viewing rights. This function is called automatically for documents with limited user rights. The interface of the function is unified with the Essential Security Reader program. The Essential Security Suite includes the Essential Security Reader. This allows both the Author and the recipient to view documents and entails that have been given usage rights.

This function first calculates how many pages will fit in the navigation part of the screen and decrypts only that amount of pages from the document's graphical representation. The navigation previews and a full-sized first page (further called the current page) are then displayed.

Changing the current page is controlled by selecting a new page in the navigation area by the mouse cursor and double-clicking it. In addition, pressing the «PageUP» and «PageDown» initiates decryption of the previous or next batch of navigation pages.

If rights allow, the user must be able to print any part of the document. If document usage dates are limited, the following is checked:
- If someone tries to access the document beforehand, a corresponding error message is displayed and further processing terminated;
- If someone tries to access the document within the specified range, the document is opened and all further transactions are allowed in accordance to the rights set;
- If the document is opened on the last day of the specified interval, the document will be automatically purged when it will be closed; and
- If someone tries to access the document after the expiry date, a corresponding error message is displayed and the document in question is purged.

Documents are purged securely and permanently (see Guaranteed file purging detailed below for more details).

Web Form Authoring and Verification with Digital Signatures System

The system is intended for authorization of data entered by a user into a web form within some web application and guarantees their protection from any possible tampering. The authorization here means that the data was entered exactly by the same system user who owns the certificate.

This function is called as a plug-in for Internet Explorer version 6.0 and above. This function is initiated when the user is viewing a Web-form and selects Check Sign from the menu. All the values entered are regarded as a data flow that must be subjected to a standard signature verification procedure using the Crypto API functions. The digital signature is treated as an extra service field and added to the previously entered data. The signature is also used by the recipient's side to verify the data integrity. The user can also view the personal information of the person who signed the Web-form.

The function consists of the two following components:
- The client part is a standard ActiveX object, which extracts data from forms being signed, visualizes them, asks the user to acknowledge data signing, forms digital signature by means of the cryptographic kernel and submits them to a web-server; and The server part—Notary web service, is a CGI module which extracts the signature from the received form, checks it and refers the request to corresponding pages, depending on the results.

The notary service is implemented as a SOAP Web Service and performs the following commands:

Install user certificate. The user certificate is stored in local certificate storage so the signature could later be checked. After installation the service returns the certificate identifier that can be used as a user identifier in the web application system.

User signature authentication. The service checks the user signature and if it is correct, an authentication data is returned, consisting of a certificate identifier, a timestamp and a separate signature of all data; if the signature is not correct, the service returns an error message, all authentication activity is logged for additional control.

Authentication checking. This command checks the previously performed authentication Local Key Manager The system makes keys and manages certificates for end users. This function includes:

Viewing certificates in different local certificate storages;

Marking certificates for which the user has secret keys;

Regrouping certificates in local storages;

Requesting new certificates from a specified Certificate Authority;

Withdrawing certificates from a specified Certificate Authority; and

Instant generation of new certificates and their corresponding keys.

Central Document Storage

This function provides secure corporate document storage. It includes the following functionality:

Prevents unauthorized access attempts to the documents located in the storage;

Username/password authorization and rights assignment on connection to the storage;

Places document into the storage;

Stores document versions which occur during coordination process;

Fetches the latest document version from the storage by default;

Lists document versions;

Obtains a specific document version from the storage; and

Receives the comments to a document which occurred during coordination process.

Document Coordination and Approval System

This function provides support for automated document coordination and approval process. It includes the following functionality;

Creating, viewing and modifying of the document coordination route;

Automatically selecting the next coordination point and sending the document this way;

Analyzing the document coordination period and notifying the document's author if dates are violated; and Automatically sending the document to approval, after it has undergone the coordination process.

Audit System

This function monitors all user actions when working with documents. It includes the following functionality:

Records authorized and unauthorized user actions like opening, editing, printing, distribution and viewing documents from a central storage;

Records whenever users try to access a document, their access and usage rights, and whether they have enough privileges to do so; and Reports all suspicious user activities to the security service.

Guaranteed File Purging

Guaranteed file purging corresponds to the DoD 5220.22-M standard requirements specification in this embodiment. This function deletes files bypassing the system Recycle Bin procedure. The deleted data is impractical to restore, either partially or wholly.

Cryptographic Kernel

"Both versions of the system perform information encryption/decryption and digital signature forming/checking. The kernel-implemented operation set defines the system cryptographic functionality.

The cryptographic kernel includes two kinds of operations: Basic Stream Operations and file level wrappers.

Basic Stream Operations

Basic stream operations include cryptographic operations on abstract data streams without binding them to their storage and allocation options. The operations include:

Fetching essential X.509 certificates and their corresponding secret keys;

Data streams encryption and decryption; and

Data stream digital signatures forming and checking.

Digital signatures are additional information attached to the protected data. They are derived from the contents of the document being signed and is formed with a secret key. Digital signatures are characterized by the following:

Digital signatures are not applied to a document accidentally;

Digital signatures are only for one specific signing person, and nobody else can sign the document;

Digital signatures recognize the document's contents and the time when it was applied; and A signing person can not decline the existence of the signature at a later time.

File Level Wrappers

These operations manipulate cryptographic objects at the file level. File-level wrappers are based on the crypto container concept. All cryptographic objects, associated with a single original file, are encapsulated into a single file of compound structure (cryptocontainer). These objects include:

Original file contents (either plain or encrypted);

Usage rights imposed on every recipient after the document is decrypted;

A symmetric key to encrypt data;

Digital signature applied to original file contents (one or more);

A session key to encrypt the symmetric key, derived from the "document's recipient passport" (limited version), or received from the special central system service (commercial version);

Public keys certificates to check the signatures; and

Other objects, as needed.

A cryptocontainer is stored in the same folder as the original file. Its name is modified by attaching an additional extension, which prevents incorrect file processing on systems where the product is not installed.

The following functionality is also included in the commercial version:
   Adding a special general signature into a cryptocontainer, which secures the document together with all signatures already applied to it; and
   Adding text comments and/or additional files into a cryptocontainer.
The above functionality add the following operations:
   Adding an unencrypted document to a cryptocontainer;
   Extracting an unencrypted document from a cryptocontainer;
   Encrypting an unencrypted document in a cryptocontainer;
   Encrypting an unencrypted document from a separate file into a cryptocontainer;
   Decrypting a document in a cryptocontainer;
   Decrypting document contents into a separate file;
   Adding a digital signature to an unencrypted document in a cryptocontainer;
   Adding a digital signature to an encrypted document in a cryptocontainer;
   Adding a general digital signature to an unencrypted document in a cryptocontainer;
   Verifying a digital signature to an unencrypted document in a cryptocontainer;
   Verifying a digital signature to an encrypted document in a cryptocontainer;
   Viewing the author's and digital signature info; and
   Setting users' access and storage rights;
   Viewing users' access and usage rights info;
   Removing digital signatures; and
   Guaranteed file purging.

Transparency Access Option

The transparency subsystem extending the system functionality. The transparency subsystem provides a way to process encrypted and signed files without any additional user actions. When someone tries to access a file, the subsystem reproduces the file's original state in some separate buffer space, grants the user access to the file located in this space and later purges the buffer space, reflecting all changes done to the file there into the actual file. Any action this subsystem takes does not change the file's cryptographic state (except for purging all digital signatures if the file was modified).

Thus, from the point of view of this subsystem, there are three file categories:
   Original files, which are left intact throughout all operations;
   Cryptocontainers, processed by the subsystem and hidden from usual applications; and
   Virtual files derived and modeled by the subsystem from meaningful contents of cryptocontainers.

To support the transparent file processing logic, simultaneous existence of the original file and corresponding cryptocontainer is considered a conflict, which should be resolved by the user's choice of which of the files should be considered the actual file. From the point of view of most applications, cryptocontainers are hidden, while virtual files are indistinguishable from original files.

In this embodiment, all standard applications which require transparent file access have their entries in the system registry. For these applications, opening an encrypted and signed file will always mean verifying its integrity, signatures and then decryption; likewise, when the file is closed, it is encrypted and all present signatures are voided if the file has been modified. For applications with no associated extensions, transparent access to encrypted files is not provided.

The system includes the following transparency functions:
   "Soft" transparency activation and deactivation. Stops the transparency provision service correctly. Transparency drivers are not unloaded on user's mode change, as it is a possible system consistency threat, but switched into passive request filtration mode. In this mode, all requests are being readdressed to the underlying driver, usually a file system driver, without any changes.
   Support for transparency driver configuration, which will allow expanding the list of containers meant for transparent access without making any changes to the actual driver code. This will make applying transparency to different container types (extensions, adding new container types).
   Processing state requests. Returns current driver state, and lets a user-mode application determine this state (active/passive, loaded/unloaded) to provide more optimal (speed+reliability) transparency system functioning.
   Providing transparent access to a specified directory. Allows turning transparency on for single folders.
   Restoring original file size information. Allows file system browsers (Explorer, Windows Commander, etc) show the actual size of the file (but not the container's size, which is always larger). This also allows for correct functioning of several applications which require exact actual numbers (e.g., a file search offset specified from the end, and not from the beginning of a file)
   Cache redirection engine. A proper redirection engine will be able to convey all data necessary to reconstruct the original file. Requests to a file are redirected to the cryptographic cache, which stores the decrypted copy of a file, and encrypts it when the file is closed.
   Folder requests handling. Handles folder listing requests, hiding crypto containers and substituting them with their corresponding virtual files.
   Opening, reading and writing to a cached file handling; reconstruction on first read/write.
   Implementing cache elements creation and deleting engine. Gives control over the current cache state.
   Implementing kernel-mode and user-mode components interaction engine via asynchronous procedure call (APC) engine, which is vital for transparency drivers and services interaction.
   Implementing a user interface prototype, this will provide access to the crypto kernel functions (encryption/decryption, signing/signature verification).

In order to more clarify the invention, the following describes more details of the invention as described through the figures.

FIG. 1 illustrates a Passport generation screenshot. The Passport is generated upon combining four parameters of computer hardware and secure digital certificate in this embodiment.

Figure 2:
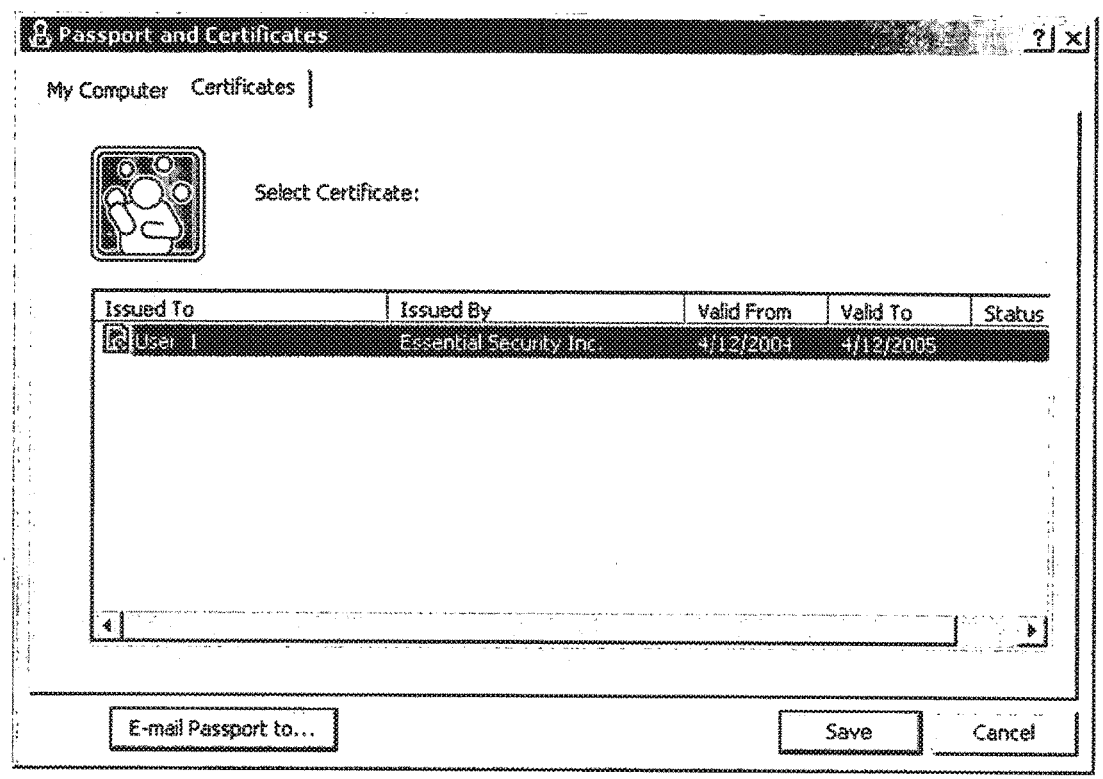
FIG. 2 is an example screenshot showing the ability to select a Digital Certificate.

FIG. 2 illustrates the ability to import and select Digital Certificates of different certificate formats is another unique feature of the product. A user can have multiple digital certificates and may choose which one to use when signing documents.

Figure 3:
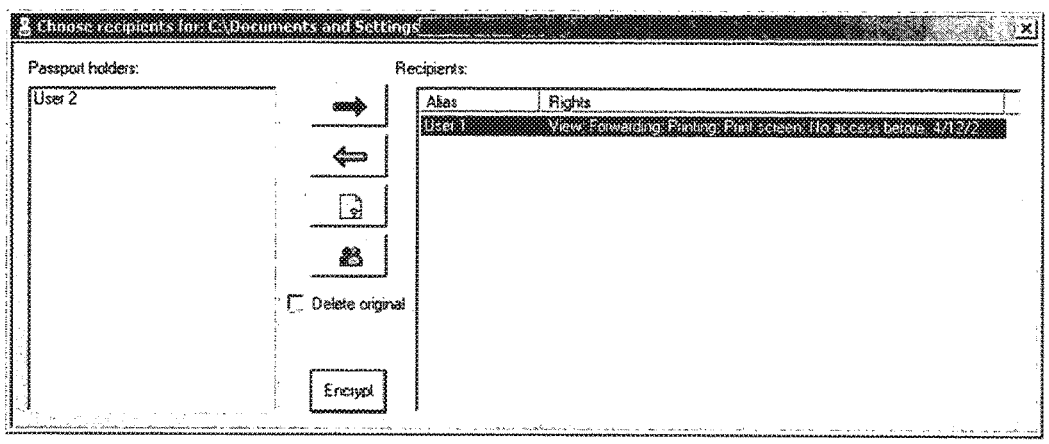
FIG. 3 is an example screenshot illustrating selecting a recipient.

FIG. 3 illustrates the option of selecting recipients to send encrypted items to.

Figure 4:
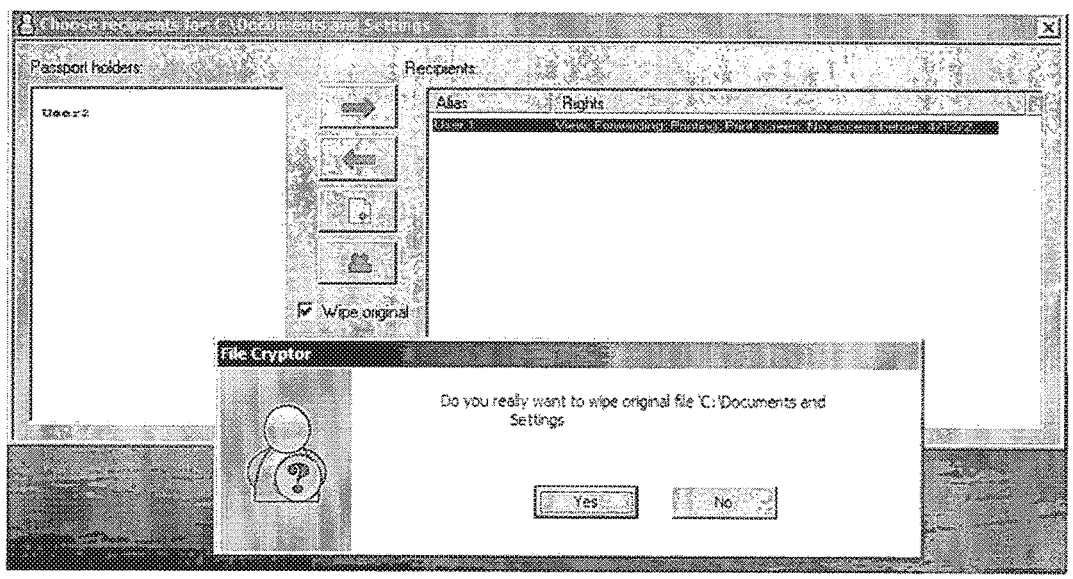
FIG. 4 is an example screenshot of wiping an original file.

FIG. 4 illustrates the option to choose to delete the original document for enhanced security.

Figure 5:
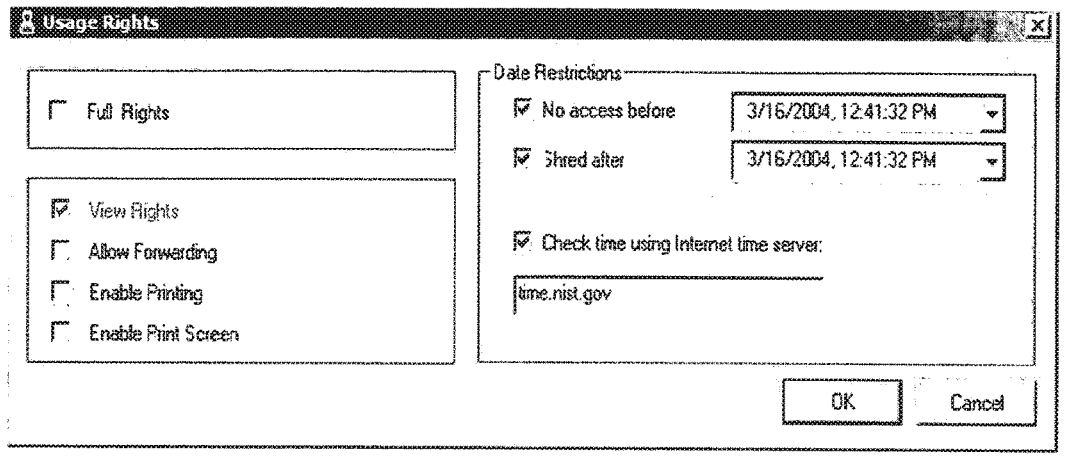
FIG. 5 is an example of a Digital Rights Management Screenshot.

FIG. 5 illustrates a Digital Rights Management Screenshot allowing the owner of the document restrict rights to: View only; Disable/Allow forwarding; Disable/Allow Printing; Disable/Allow Print Screen; Preventing access before certain date and hour Securely delete document after certain date and hour; Check dates using Local Server; and Internet Time Server.

Figure 6:
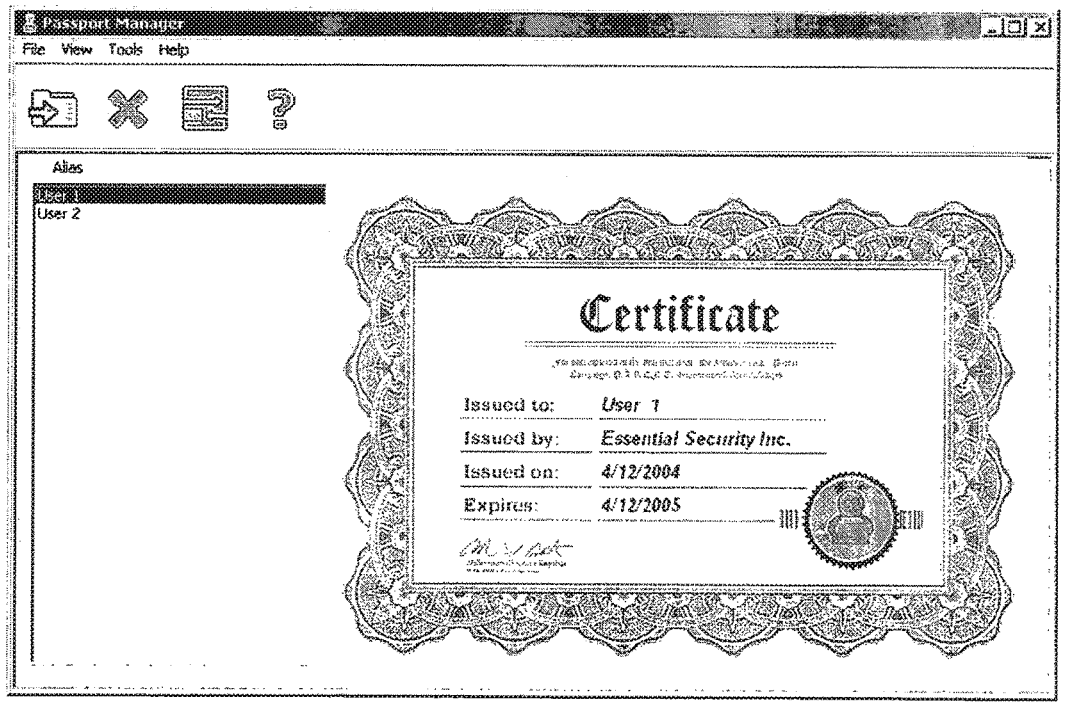
FIG. 6 is an example of a Passport Manager.

FIG. 6 illustrates a Passport Manager. The manager provides a user with the ability to manage passport information. Users may also request other people passport information using the Request Passport Feature.

FIG. 7 illustrates a Passport Request feature that allows a user to automatically request passport information by emailing to any person in an address book with a standard or customized message.

Figure 8:
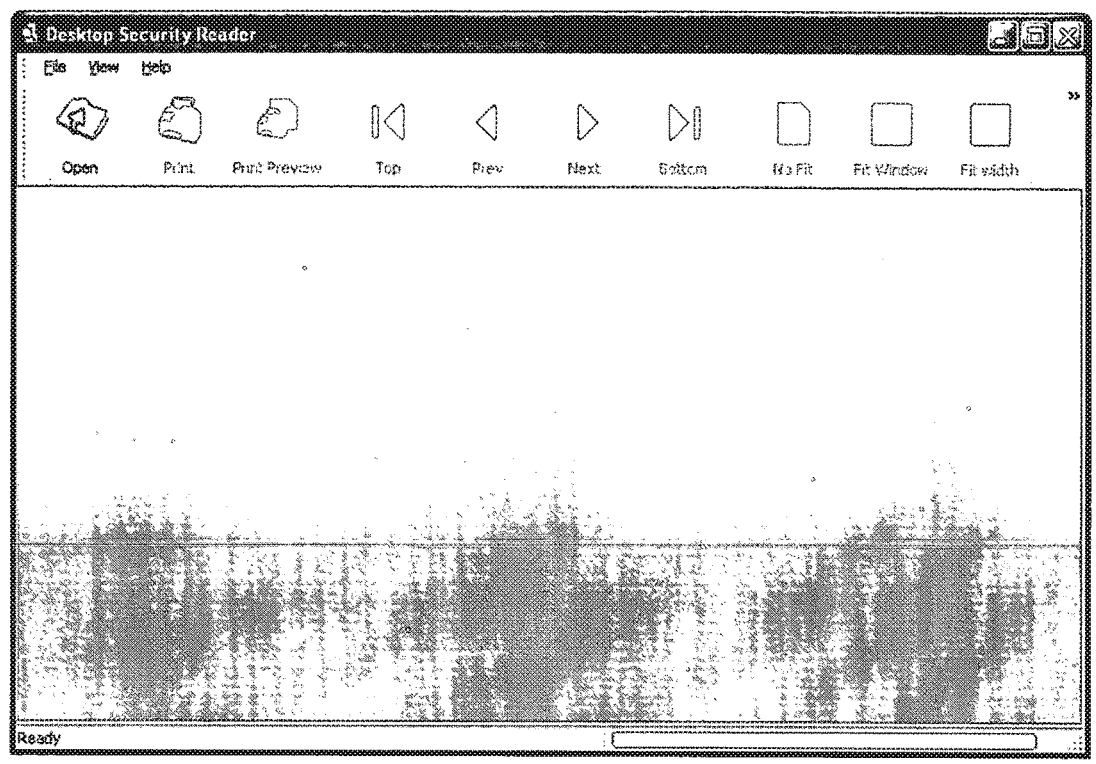
FIG. 8 is an example screenshot of a Desktop Security Reader.

FIG. 8 illustrates a Desktop Security Reader. The Reader is a very unique module, allowing a user to decrypt and view secure information.

Figure 9:
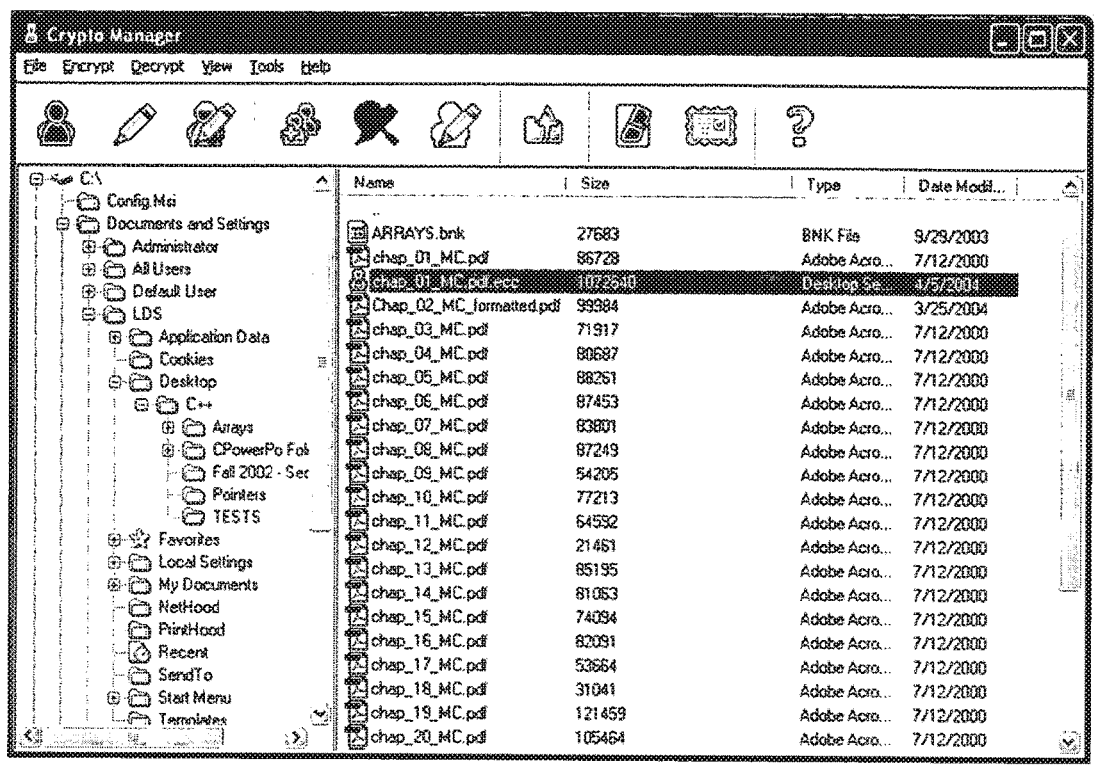
FIG. 9 is an example screenshot of a Crypto Manager.

FIG. 9 illustrates a Crypto Manager Module. The Module provide the user with the ability to manage and secure their information. The User may digitally sign and encrypt information, set digital rights or securely delete documents. The User can also easily right click a document, assign rights and encrypt.

Figure 10:
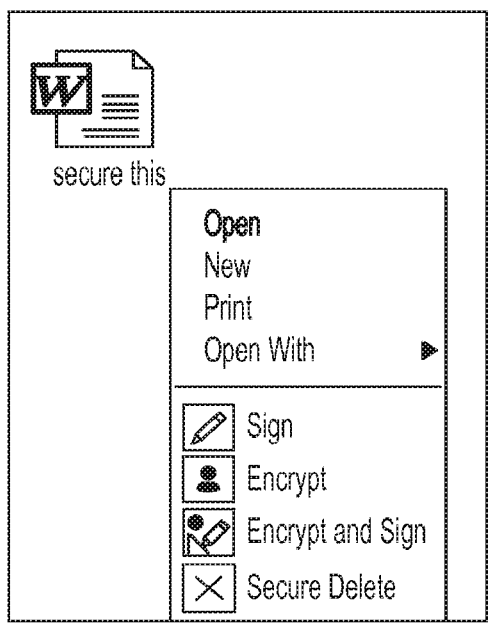
FIG. 10 is an example screenshot of Crypto Manger options for a file.

FIG. 10 illustrates a Crypto Manger Explorer Plug-in: The options shown are provided by right clicking on any document or folder.

Figure 11:
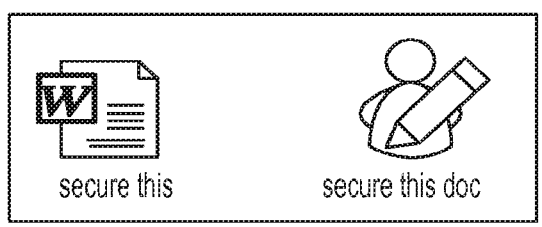
FIG. 11 is an example icon for a digitally signed document.

FIG. 11 illustrates a digitally signed document.

Figure 12:
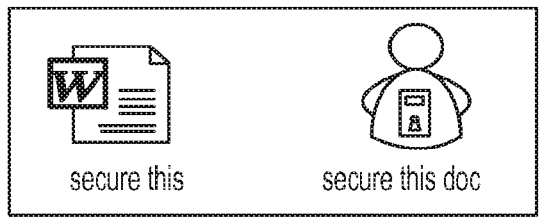
FIG. 12 is an example icon of an encrypted document.

FIG. 12 illustrates an Encrypted document.

FIG. 13 illustrates a Certificate. This Certificate appears when an email or document has been digitally signed to verify the author/sender authenticity.

Figure 14:
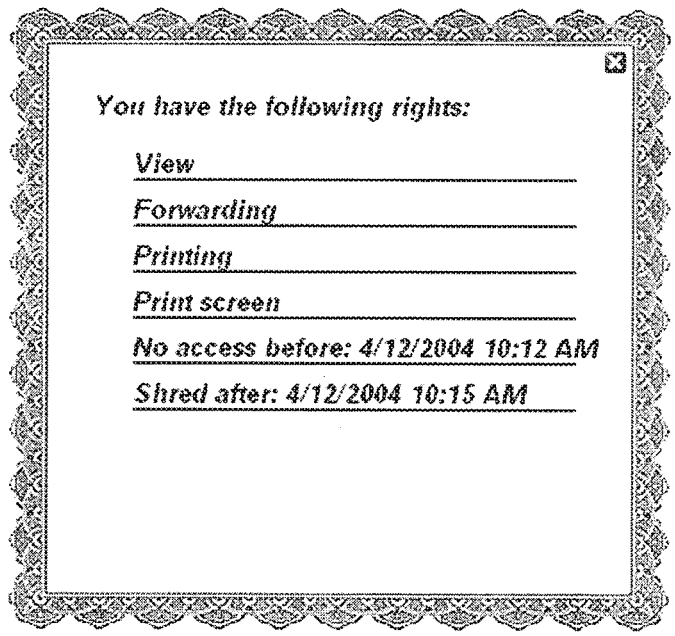
FIG. 14 is an example of details of a certificate.

FIG. 14 illustrates an assigned rights Certificate. This Certificate illustrates the rights a User has been assigned.

It is understood that several modifications, changes and substitutions are intended in the foregoing disclosure and in some instances some features of the invention will be employed without a corresponding use of other features. Accordingly, it is appropriate that the appended claims be construed broadly and in a manner consistent with the scope of the invention.

The invention claimed is:

1. A method for sending data to a recipient the method comprising:
   generating a graphical representation of an electronic document;
   encrypting information comprising the graphical representation of the electronic document and a set of recipient rights for the electronic document using a public key of the recipient;
   encrypting the encrypted information using a symmetric key;
   placing a data stream resulting from the encrypting of the encrypted information into a container; and
   sending the container to the recipient.

2. The method of claim 1 wherein the set of rights include at least one from the following set:
   reading rights indefinitely;
   reading rights up to a preset date;
   printing rights indefinitely;
   printing rights up to a preset date;
   copying rights indefinitely; and
   copying rights up to a preset date.

3. The method of claim 1 wherein the encrypting the graphical representation of the electronic document includes utilizing a terminal of the recipient to establish a computer passport.

4. The method of claim 3 further including utilizing at least one of the following to generate a unique symmetry key to encrypt a session key that is used to encrypt the electronic document and the set of recipient rights: the terminal's MAC address, master serial number, Basic Input/Output System (BIOS) information or BIOS date.

5. The method of claim 1 further including using a certificate of a sender.

6. The method of claim 1 farther including selecting from a set of certificates of a sender.

7. The method of claim 1, wherein the container is sent to the recipient as a message attachment.

8. A system for sending data to a recipient, the system comprising a processor and memory, wherein the processor and the memory in combination are operable to:
   generate a graphical representation of an electronic document;
   encrypt the graphical representation of the electronic document and a set of recipient rights for the electronic document; and
   send the encrypted graphical representation of the electronic document and the set of recipient rights to the recipient.

9. The system of claim 8 wherein the set of rights include at least one from the following set:
   reading rights indefinitely;
   reading rights up to a preset date;
   printing rights indefinitely;
   printing rights up to a preset date;
   copying rights indefinitely; and
   copying rights up to a preset date.

10. The system of claim 8 wherein the encryption of the graphical representation of the electronic document includes utilizing a terminal of the recipient to establish a computer passport.

11. The system of claim 10 further including utilizing at least one of the following to generate a unique symmetry key to encrypt a session key that is used to encrypt the electronic document and the set of recipient rights: the terminal's MAC address, master serial number, Basic Input/Output System (BIOS) information or BIOS date.

12. The system of claim 8 further including using a certificate of a sender.

13. The system of claim 8 wherein the processor and the memory in combination are operable to select from a set of certificates of a sender.

14. The system of claim 8 wherein the processor and the memory in combination are operable to select a document to wipe out completely from any storage device.

15. A method for sending an electronic document to a recipient the method comprising:
   generating a graphical representation of the electronic document;
   encrypting the graphical representation of the electronic document and a set of recipient rights for the electronic document;
   sending the encrypted graphical representation of the electronic document to the recipient; and
   providing the recipient access to the graphical representation of the electronic document according to the set of recipient rights.

16. The method of claim 15 wherein the encrypting the graphical representation of the electronic document includes utilizing a terminal of the recipient to establish a computer passport.

17. The method of claim 16 further including utilizing at least one of the following to generate a unique symmetry key to encrypt a session key that is used to encrypt the electronic document and set of recipient rights: the terminal's MAC address, master serial number, Basic Input/Output System (BIOS) information or BIOS date.

18. The method of claim 15 further including using a certificate of a sender.

19. The method of claim 15 further including selecting from a set of certificates of a sender.

20. The method of claim 15 further including selecting a document to wipe out completely from any storage device.

* * * * *